US010233768B1

United States Patent
Watts, III et al.

(10) Patent No.: US 10,233,768 B1
(45) Date of Patent: Mar. 19, 2019

(54) APPARATUS AND PROCESS FOR OPTIMIZING TURBINE ENGINE PERFORMANCE VIA LOAD CONTROL THROUGH A POWER CONTROL MODULE

(71) Applicant: Florida Turbine Technologies, Inc., Jupiter, FL (US)

(72) Inventors: Oran A. Watts, III, Indianapolis, IN (US); John W Polywoda, III, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/928,543

(22) Filed: Mar. 22, 2018

(51) Int. Cl.
| | |
|---|---|
| *F02C 9/26* | (2006.01) |
| *F02C 9/28* | (2006.01) |
| *B64D 39/02* | (2006.01) |
| *B64D 27/02* | (2006.01) |
| *B64D 27/10* | (2006.01) |
| *B64D 27/24* | (2006.01) |
| *F01D 15/10* | (2006.01) |
| *B64C 39/02* | (2006.01) |

(52) U.S. Cl.
CPC ............ *F01D 15/10* (2013.01); *B64C 39/024* (2013.01); *B64D 27/10* (2013.01); *B64D 27/24* (2013.01); *F02C 9/263* (2013.01); *F02C 9/28* (2013.01); *B64C 2201/042* (2013.01); *B64C 2201/048* (2013.01); *B64D 2027/026* (2013.01); *F05D 2220/323* (2013.01); *F05D 2220/76* (2013.01); *F05D 2270/303* (2013.01)

(58) Field of Classification Search
CPC . F01D 15/10; B64C 39/024; B64C 2201/042; B64C 2201/048; B64D 27/10; B64D 27/24; B64D 2027/026; F02C 9/263; F02C 9/28; F05D 2220/323; F05D 2220/76; F05D 2270/303
USPC .......................................................... 290/52
See application file for complete search history.

(56) References Cited

U.S. PATENT DOCUMENTS

| | | | | |
|---|---|---|---|---|
| 4,267,693 | A * | 5/1981 | Stearns ...................... | F02C 9/28 60/39.281 |
| 4,296,601 | A * | 10/1981 | Martin ....................... | F02C 9/28 60/224 |
| 4,326,376 | A * | 4/1982 | Stearns ...................... | F02C 9/28 60/39.281 |
| 5,635,768 | A * | 6/1997 | Birch ......................... | H02P 9/48 290/40 C |
| 6,622,489 | B1 * | 9/2003 | Najera ....................... | F02C 3/22 417/295 |
| 2002/0163819 | A1 * | 11/2002 | Treece ....................... | F02B 43/10 363/34 |

(Continued)

*Primary Examiner* — Julio C. Gonzalez
*Assistant Examiner* — Charles Reid, Jr.
(74) *Attorney, Agent, or Firm* — John Ryznic

(57) ABSTRACT

A power plant for an aircraft such as an unmanned aero vehicle in which a gas turbine engine drives an electric generator to produce electrical power for a system load of the aircraft. An engine control unit monitors engine performance and regulates engine power output through fuel flow control to a combustor. A power control module regulates power output of the generator to the system load and to a battery through a bus. A pulse width modulation is used between the power control module and the bus to optimize performance of the gas turbine engine instead of adjusting fuel flow to the combustor.

5 Claims, 1 Drawing Sheet

(56) References Cited

U.S. PATENT DOCUMENTS

| | | | | |
|---|---|---|---|---|
| 2002/0173897 | A1* | 11/2002 | Leamy | F02C 9/28 |
| | | | | 701/100 |
| 2003/0140614 | A1* | 7/2003 | Nearhoof, Sr. | F02C 9/28 |
| | | | | 60/39.281 |
| 2004/0011050 | A1* | 1/2004 | Inoue | F02C 3/22 |
| | | | | 60/773 |
| 2007/0245746 | A1* | 10/2007 | Mollmann | F02C 9/28 |
| | | | | 60/779 |
| 2009/0326781 | A1* | 12/2009 | Mukavetz | F02C 9/28 |
| | | | | 701/100 |
| 2010/0244461 | A1* | 9/2010 | Delf | F01D 15/10 |
| | | | | 290/40 F |
| 2011/0041510 | A1* | 2/2011 | Sasaki | F02C 9/28 |
| | | | | 60/776 |
| 2016/0186675 | A1* | 6/2016 | Gunn | B60K 6/46 |
| | | | | 290/50 |

* cited by examiner

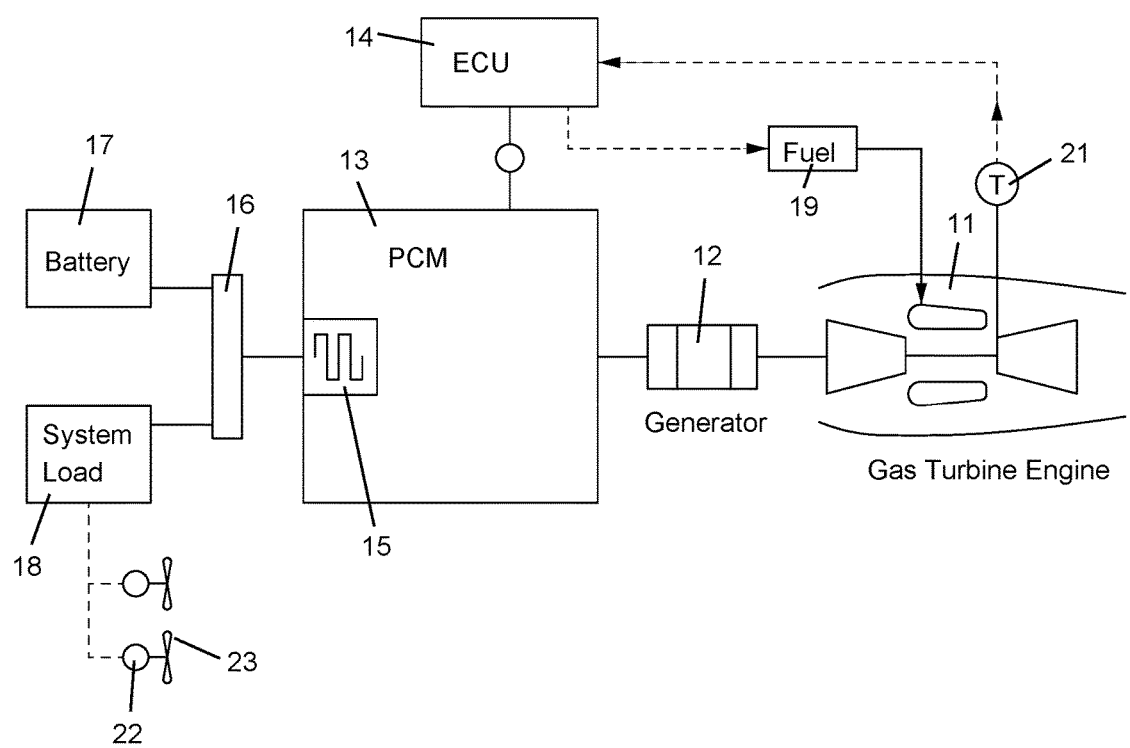

APPARATUS AND PROCESS FOR OPTIMIZING TURBINE ENGINE PERFORMANCE VIA LOAD CONTROL THROUGH A POWER CONTROL MODULE

GOVERNMENT LICENSE RIGHTS

This invention was made with U.S. Government support under contract number FA8650-14-D-2400-FA8650-17-F-2707 awarded by the U.S. Air Force Research Laboratory. The U.S. Government has certain rights in the invention.

CROSS-REFERENCE TO RELATED APPLICATIONS

None.

BACKGROUND OF THE INVENTION

Field of the Invention

The present invention relates generally to a power plant for an aircraft, and more specifically to a gas turbine engine driven electric generator to supply a vehicle load with power optimization.

Description of the Related Art Including Information Disclosed Under 37 CFR 1.97 and 1.98

A gas turbine engine drives an electric generator to produce electrical power to supply a system load to an aircraft such as an Unmanned Aero Vehicle or UAV. As the generator power increases with a demand for high load, the gas turbine engine must generate more power. To increase power output of the engine, more fuel is required and the hot gas flow temperature increases to a point where the gas turbine can be overheated. Thus, the maximum load that the generator can supply is based on the maximum power output the gas turbine can generate which is a function of the gas turbine maximum temperature.

BRIEF SUMMARY OF THE INVENTION

An aircraft power plant such as a UAV in which a gas turbine engine drives an electric generator to produce electrical power used to supply a system load of the aircraft. In a UAV, the system load can be a number of fans or propulsors. An engine control unit monitors and controls the operation of the gas turbine engine including the gas flow temperature into the gas turbine and the fuel flow to the combustor. A power control module monitors the generator speed and power output and system load and communicates with the engine control unit for input and output. When the system load increases, the engine control unit can increase a power output of the generator by increasing fuel flow to the combustor. When a maximum temperature of the gas flow through the turbine is reached, the engine control unit will limit the fuel flow to prevent extreme temperature in the gas turbine while instructing the power control unit to regulate the power flow from the generator to the system load.

The system of power control of the present invention utilizes an electrical Power Conditioning and Control Module (PCM) and an Engine Control Unit (ECU) to minimize the operating relationships between the turbine engine and the generator, battery, and electrical load. The load is serviced with electrical power from a combination of the battery and the power control module, engine control unit, generator and the gas turbine engine. The control laws incorporated within the ECU and PCM work together to maintain the turbine engine at its optimal operating point for efficiency and safe operation while maximizing the potential electrical power available for the load. The principles covered by this invention include: Separation of load management from the actual turbine engine operating point; Pulse Wave Modulation or other technique to maintain sufficient electrical potential (voltage) at the PCM output to service the battery/load combination; and, use of an electrical battery to provide partial load support.

BRIEF DESCRIPTION OF THE SEVERAL VIEWS OF THE DRAWINGS

FIG. 1 shows a schematic view of the power plant of an aircraft with optimization of turbine engine performance via load control of the present invention.

DETAILED DESCRIPTION OF THE INVENTION

The present invention is a power plant for an aircraft such as an unmanned aero vehicle or UAV in which a gas turbine engine 11 drives an electric generator 12 to produce electrical power for a system load 18 (parts that require electrical power) of the aircraft. Multiple fans 23 driven by electric motors 22 or propulsors can be the system load for a UAV. A power control module (PCM) 13 controls an electric output of the generator 12. An engine control unit (ECU) 14 regulates operation of the gas turbine engine 11 such as monitoring the gas turbine temperature such as the hot gas flow temperature entering the gas turbine 21 and regulates the engine power by controlling fuel flow 19 to the combustor. The power control module 13 exchanges data with the engine control unit 14 in order to optimize performance of the power plant. The generator 12 produces electrical power for storage in a battery 17 or to power the system load 18. The battery 17 provides partial load support for the system load 18. The generator 12 passes electric power through a pulse wave modulation 15 to maintain sufficient electrical potential (voltage) between the PCM output and a bus 16 that then distributes the electrical power to the battery 17 and the system load 18. The system load 18 is serviced by electrical power from the battery 17 and the generator 12.

The Engine Control Unit (ECU) 14 is an electronic device used to assess and control the gas turbine engine. Primarily an ECU is a computer system used to communicate with the outside world while controlling a gas turbine engine and, directly or indirectly, other elements of the system using the gas turbine engine. The ECU 14 houses signal conditioning hardware and software that interprets electrical sensors which monitor the state of the gas turbine engine such as inlet temperature and pressure, internal engine pressures, system fuel pressures, internal and external temperatures. The ECU 14 has outputs that drive various effectors that directly control or modify physical interfaces to the engine such as fuel pumping and metering and fuel valve switching. When used in a turbo-alternator application, the ECU 14 also communicates with a Power Control Module (PCM) 13 which has responsibility to manage large electrical machinery that may be used with the total system.

The ECU 14 may house a state model of the system being controlled in order to improve the control performance. It also includes logic that determines the health of various elements of the system such as sensor performance and engine thermal-mechanical performance. The ECU 14 communicates to the host/customer via a serial digital communication bus. The ECU 14 is powered by the host/customer via a 28 VDC electrical bus. The ECU 14 may communicate with other system components, such as a PCM, via a (separate) serial digital bus.

The Power Control Module (PCM) 13 is an electronic device that manages an electrical machine (EM) which provides both a monitoring function and an electrical generation function while connected to a gas turbine engine. In addition to the basic control of the EM, the PCM 13 monitors the electrical and thermal condition of the EM and it communicates with the outside world via a digital communication bus. In order to perform these functions, the PCM 13 incorporates a very high speed logic controller which, among other things, manages high power electrical switching for the EM. The PCM 13 provides direct current voltage to the customer and also uses power from that bus to energize the EM for the motoring function. A by-product of managing the EM is knowledge of the EM speed of operation. This speed sense is shared with the turbo-alternator control system for management of the whole system. Logic is included in the PCM 13 to determine faults in the shafting between the EM and the gas turbine engine. Additional logic is included that monitors customer electrical load transients which the TA control systems uses to assure safe operation of the system.

The PCM 13 also has a low voltage input to provide electrical power for its operation. The PCM 13 communicates with the rest of the turbo-alternator control system via a serial data bus. The PCM 13 has high power electrical connection to each phase of the EM and it also connects to two temperature monitoring sensors in the EM.

As the system load 18 increases, more electrical power from the generator 12 is required, and thus more power from the gas turbine engine 11 is required. To increase the power of the engine 11, more fuel flow is required to the combustor. More fuel flow to the combustor results in a high gas flow temperature through the gas turbine. The gas turbine has a maximum safe operating temperature limit before damage or failure of the gas turbine and thus the engine occurs. Once the ECU senses that the gas turbine temperature is at a maximum safe temperature, the ECU instructs the PCM to take action and regulate the power output of the generator 12 through the pulse wave modulation 15. The control laws incorporated within the ECU 14 and PCM 13 work together to maintain the turbine engine at its optimal operating point for efficiency and safe operation while maximizing the potential electrical power available for the system load 18. Instead of adjusting the fuel to limit the exhaust gas temperature of the gas turbine, the system adjusts the power control module load output.

We claim the following:

1. A process for operating a power plant for a small aircraft comprising the steps of:
    operating a small gas turbine engine;
    driving an electric generator with the small gas turbine engine to produce electrical energy;
    storing some of the electrical energy in a battery;
    supplying electrical energy from either the electric generator or the battery to a system load;
    monitoring a temperature of a hot gas stream passing through a turbine of the gas turbine engine; and,
    when the temperature of the hot gas stream passing through the turbine is too hot, then reducing a power outlet of the gas turbine engine by reducing the electrical power output from the generator while increasing electrical energy supply to the system load from the battery; and when the load on the turbine results in a turbine inlet temperature above a safe level, then adjusting the load to the system load from the generator through a pulse wave modulation.

2. The process for operating the power plant for the small aircraft of claim 1, and further comprising the step of:
    the system load is a plurality of electric motors each connected to a fan.

3. The process for operating the power plant for the small aircraft of claim 1, and further comprising the step of:
    the small aircraft is an unmanned aero vehicle.

4. A power plant for an aircraft comprising:
    a gas turbine engine with a compressor driven by a turbine and a combustor to generate a hot gas flow passing through the gas turbine;
    an electric generator driven by the gas turbine engine to produce electrical power for a system load of the aircraft;
    an engine control unit to monitor and control the gas turbine engine that includes a gas flow temperature in the turbine and fuel flow to the combustor;
    a power control module to regulate output of the electric generator;
    the engine control unit and the power control module communicating together to maximize the electric generator output while maintaining gas turbine working fluid temperature within a safe operating condition and supplying additional electrical power to the load system from a battery; and,
    the engine control unit and the power control module communicating together when the temperature of the hot gas stream passing through the turbine is too hot maintains fuel flow to the combustor while decreasing electrical power produced by the generator and adding electrical power from the battery; and when the load on the turbine results in a turbine inlet temperature above a safe level, then adjusting the load to the system load from the generator through a pulse wave modulation.

5. A power plant for an aircraft comprising:
    a gas turbine engine with a compressor driven by a turbine and a combustor to generate a hot gas flow passing through the gas turbine;
    an electric generator driven by the gas turbine engine to produce electrical power for a system load of the aircraft;
    an engine control unit to monitor and control the gas turbine engine that includes a gas flow temperature in the turbine and fuel flow to the combustor;
    a power control module to regulate output of the electric generator; and,
    the engine control unit and the power control module communicating together to maximize the electric generator output while maintaining gas turbine working fluid temperature within a safe operating condition and supplying additional electrical power to the load system from a battery; and, when the load on the turbine results in a turbine inlet temperature above a safe level, then adjusting the load to the system load from the generator through a pulse wave modulation; and
    the small aircraft is an unmanned aero vehicle.

* * * * *

UNITED STATES PATENT AND TRADEMARK OFFICE
CERTIFICATE OF CORRECTION

PATENT NO. : 10,233,768 B1
APPLICATION NO. : 15/928543
DATED : March 19, 2019
INVENTOR(S) : Oran A. Watts, III and John W. Polywoda, III Page 1 of 1

It is certified that error appears in the above-identified patent and that said Letters Patent is hereby corrected as shown below:

On the Title Page

Item (72) Please correct the full name of the last inventor from John W Polywoda, III to John A. Polywoda, III.

Signed and Sealed this
Thirtieth Day of April, 2019

Andrei Iancu
*Director of the United States Patent and Trademark Office*